No. 657,406. Patented Sept. 4, 1900.
H. C. FOUTS.
FIFTH WHEEL.
(Application filed May 15, 1900.)
(No Model.)
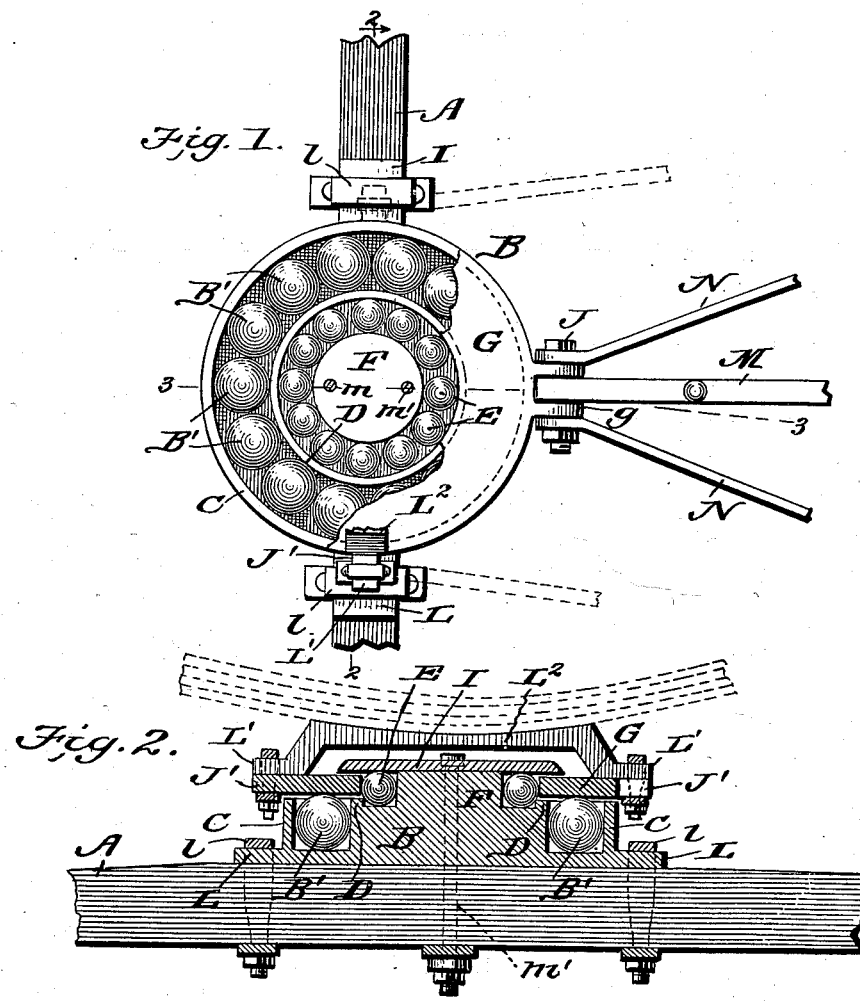
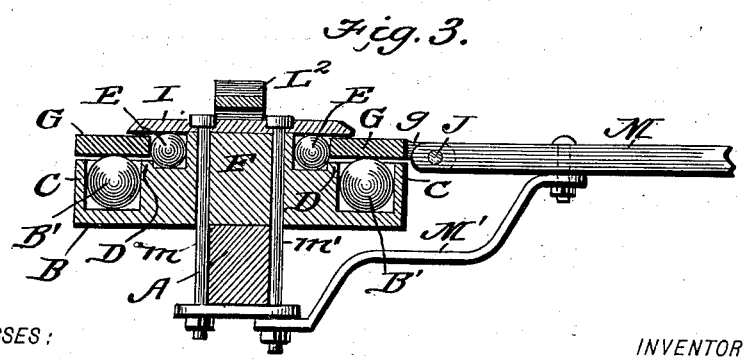
WITNESSES:
M. S. Blondel.
Edw. W. Byrn.
INVENTOR
Hiram C. Fouts.
BY Munn & Co.
ATTORNEYS
THE NORRIS PETERS CO., PHOTO-LITHO., WASHINGTON, D. C.

UNITED STATES PATENT OFFICE.

HIRAM CICERO FOUTS, OF EMORY, TEXAS.

FIFTH-WHEEL.

SPECIFICATION forming part of Letters Patent No. 657,406, dated September 4, 1900.

Application filed May 15, 1900. Serial No. 16,749. (No model.)

*To all whom it may concern:*

Be it known that I, HIRAM CICERO FOUTS, of Emory, in the county of Rains and State of Texas, have invented a new and useful Improvement in Fifth-Wheels, of which the following is a specification.

My invention relates to fifth-wheels for vehicles of that form in which a turn-table containing ball-bearings is employed; and my invention consists in the peculiar construction and arrangement of the parts of the same designed to form a simple, practical, strong, and sensitive wheel, as will be hereinafter more fully described with reference to the drawings, in which—

Figure 1 is a plan view with part of the upper plates removed. Fig. 2 is a vertical section taken longitudinally to the axle on line 2 2, and Fig. 3 is a vertical section at right angles to Fig. 2 on line 3 3.

In the drawings, A represents the axle, and B is a turn-table plate having two upwardly-projecting circular flanges C and D and a raised central boss or hub F, all of which are preferably formed of one piece of metal. The flanges C and D form between them a circular channel or raceway for a series of steel balls B', while the flange D and boss F form between them a similar raceway for another series of steel balls E, which latter are somewhat smaller than B', but on a higher plane, and the raceway containing them somewhat shallower than the outer one.

Attached to opposite sides of the turn-table B and projecting over the axle there are formed on or bolted to said turn-table oppositely-projecting and diametrically-arranged lugs L, which, by means of clips $l$, are securely strapped and bolted to the axle.

The balls B' project slightly above the outer flange C, and upon said balls there rests a ring-shaped plate G, which is connected in the rear to the reach or coupling pole M, extending to the rear axle, a slotted extension $g$ being formed on the plate G, between the branches of which the coupling-pole is jointed by means of a bolt J. The balls B' and E extend slightly above the flanges, and upon said balls the ring-shaped plate G rests, the said plate resting on top of the balls B' and having the inner edge of the plate bearing against the outer surfaces of the higher series of balls E to form a pivotal center. At diametrical points on the ring-shaped plate G are formed lugs J' J', to which are bolted or otherwise connected the lugs L' L' of a seat-bar $L^2$, which spans the top of the fifth-wheel and has a curved upper surface adapted to receive the carriage-spring. (Shown in dotted lines.)

To hold the ring-shaped plate G down upon the balls a cap-plate I is fastened by bolts to the central boss F, the bolts $m\ m'$, of which there may be two or four, extending through the boss F and the bottom of the turn-table on each side of the axle, which is not weakened by the passage of a king-bolt through it. This cap-plate resting upon the boss F slightly above the ring-plate G overlaps the inner edge of the same and while holding it down permits it to freely turn on the balls B' below and against the balls E along its inner edge.

The reach or coupling pole M has a brace M', extending under the axle to a central pivot, and braces N N connect the rear axle to the bolt J, which joins the connecting-pole to the ring-plate. These braces may, however, if desired, extend to the lugs J' J' of the ring-shaped plate, as shown in dotted lines. By means of hinge-bolt J a free up-and-down motion between the axles is allowed on rough roads.

Having thus described my invention, what I claim as new, and desire to secure by Letters Patent, is—

1. A fifth-wheel comprising a turn-table with two circular raceways and series of balls, and a raised boss in the middle, the inner series of balls being in a higher plane than the outer one, a ring-shaped plate bearing with its under surface on the outer series of balls, and bearing at its inner edges against the inner series of balls, and a cap-plate bolted to the central boss and overlapping the inner edges of the ring-shaped plate substantially as described.

2. A fifth-wheel comprising a turn-table with the lugs and clamping devices for connecting them to the axle, said turn-table having two raceways and concentric series of balls, the inner set being higher than the outer set, and having also a raised boss in the center, a swiveling ring-plate resting on the outer series of balls and against the inner series of balls, and a cap-plate bolted to the central boss and overlapping the ring-plate substantially as described.

3. A fifth-wheel comprising a turn-table with a raised central boss, two concentric raceways with balls, and having also diametrically-arranged lugs with clamping devices for the axle, a ring-shaped plate resting upon the outer series of balls and against the inner series of balls, and a cap-plate overlapping the ring-plate and connected to the central boss by two or more bolts passing through the same outside of the axle as shown and described.

4. A fifth-wheel comprising a turn-table with raised central boss, two concentric raceways with balls, a ring-plate resting on the outer series of balls and against the inner series of balls and having outwardly-projecting lugs on its sides, a cap-plate bolted to the central boss and overlapping the ring-plates, and a spring-seat consisting of a bar curved on its upper side to receive the spring, and having on its lower side at its ends lugs resting upon and secured to the lugs of the ring-plates as described.

5. In a fifth-wheel, the combination with the swiveling plate arranged about a vertical center over the front axle, a connecting-pole or reach-bar hinged or jointed to the said swiveling plate, and brace-rods extended to the same hinged center between the connecting-pole and swiveling plate substantially as and for the purpose described.

In testimony whereof I have signed my name to this specification in the presence of two subscribing witnesses.

HIRAM CICERO FOUTS.

Witnesses:
B. M. McMAHAN,
V. H. MONTGOMERY.